(12) United States Patent
Brotz

(10) Patent No.: US 6,209,830 B1
(45) Date of Patent: Apr. 3, 2001

(54) APPARATUS FOR CAMERA MOUNT ON TRIPOD PLATFORM

(75) Inventor: Ralph T. Brotz, Kohler, WI (US)

(73) Assignee: Plastics Engineering Co., Sheboygan, WI (US)

(*) Notice: Subject to any disclaimer, the term of this patent is extended or adjusted under 35 U.S.C. 154(b) by 0 days.

(21) Appl. No.: 09/444,434

(22) Filed: Nov. 22, 1999

(51) Int. Cl.[7] .................................................. F16M 11/04
(52) U.S. Cl. ................................. 248/187.1; 248/181.2; 248/182.1; 248/186.2
(58) Field of Search .......................... 248/182.1, 181.1, 248/161, 183.1, 181.2, 186.2, 187.1, 163.1

(56) References Cited

U.S. PATENT DOCUMENTS

| | | | |
|---|---|---|---|
| 318,480 | * 5/1885 | Kendrick | 248/181 X |
| 1,764,721 | * 6/1930 | Hayden | 248/181 X |
| 1,780,383 | * 11/1930 | Green | 248/181 X |
| 2,672,313 | * 3/1954 | Poole | 248/183 |
| 4,016,583 | * 4/1977 | Yeates | 248/181 X |

* cited by examiner

*Primary Examiner*—Leslie A. Braun
*Assistant Examiner*—A. Joseph Wujciak
(74) *Attorney, Agent, or Firm*—Robert T. Johnson Registered Patent Agent LLC

(57) ABSTRACT

This present invention discloses apparatus for mounting a camera on a tripod platform and the camera having a pear shaped ball attached to the camera bottom and the pear shaped ball placed into a cradle cup attached to the platform of a tripod, which makes for a rapid mounting or removal of the camera from the mounting without the neccessity of unscrewing any of the mounting.

2 Claims, 3 Drawing Sheets

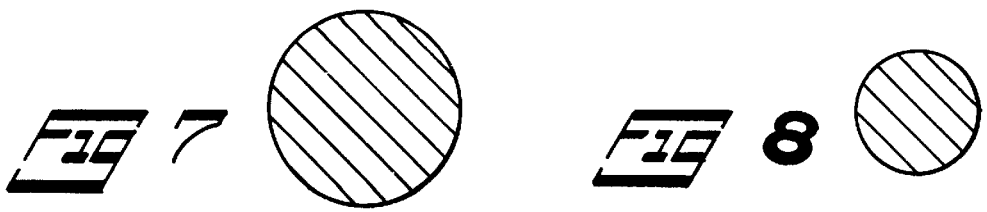
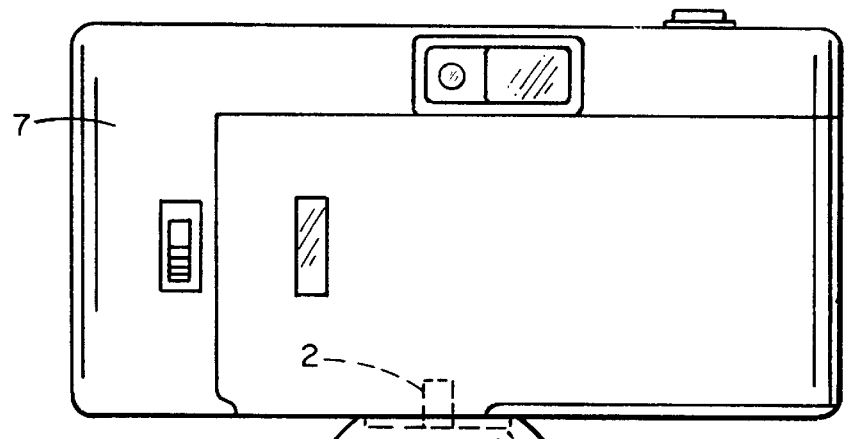
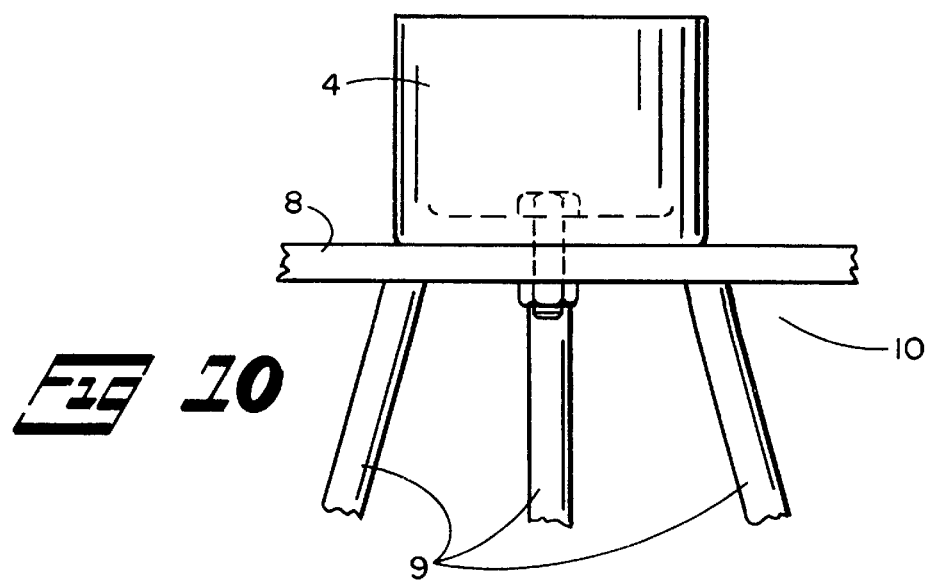

APPARATUS FOR CAMERA MOUNT ON TRIPOD PLATFORM

Picture taking by a camera requires a steady, non-moving camera for clear well defined pictures, and in view of this, cameras are mounted on tripod platforms or tables, with camera angle adjustments attained by turning of gears, or unscrewing fasteners, to obtain the proper camera aiming angle. To disassemble the camera from this conventional mounting requires manipulation to unscrew the camera from the tripod table or platform.

This present invention discloses apparatus and method for mounting a camera on a tripod platform by attaching to the camera a modified ball having a pear or partial oblate spheroid shape, and the assembly of the camera and modified ball with a conical segment part of the ball of pear shape set into a cradle cup attached to a tripod platform, to allow free rotational and tilt movement of the camera to aim at the desired picture subject.

An object of this invention is to disclose apparatus for ball and cradle cup camera mount on a tripod platform by mounting a ball having a pear or partial oblate spheroid shape, onto the bottom of a camera, and the ball having a bottom cone segment, opposite the camera mount and attaching a cradle cup of cylindrical shape and having a diameter at the upper section of the cradle cup, greater than the ball diameter to the tripod platform and the assembly of the ball mounted on the camera set in the cradle cup with the ball extending into the cradle upper section, and the cone segment of the ball extending into the cradle cup lower section having a smaller diameter than the ball to allow rotation and tilting of the camera and camera mount ball assembly.

Another object of this invention is to disclose a cradle cup mounted on a tripod platform and the cradle cup having an upper section diameter larger than the camera mount ball diameter, to allow entry of the ball shape, and the diameter of the cradle cup lower section is less than the camera mount ball diameter and the bottom cone section of the camera mount ball extends into the cradle cup lower section of cradle cup segment having a diameter less then the ball diameter.

PRIOR ART DISCLOSURE

Following is a listing of prior art U.S. patents.

U.S. Pat. No. 365,435 for PHOTO APPARATUS; Disclosure is made of a ball and socket mount for a camera.

U.S. Pat. No. 855,149 for ATTACHMENT FOR TRIPOD CAMERA: Disclosure is made of adjustable ball and socket mount for a camera mount on a tripod.

U.S. Pat. No. 916,286 for CAMERA TRIPOD; Disclosure is made of an adjustable ball and socket mount.

U.S. Pat. No. 1,280,013 for CAMERA MOUNTING; This patent discloses adjustable socket for a ball and socket mount.

U.S. Pat. No. 2,650,788 for ADJUSTABLY SUPPORTING CAMERAS; There is disclosed adjustable ball and socket mount.

U.S. Pat. No. 2,670,228 for BALL SWIVEL, TRIPOD HEAD; Ball and socket mount to allow swivel and tilt.

U.S. Pat. No. 2,703,691 for CAMERA SUPPORT; Disclosure is made of a ball and socket mount on telescoping leg.

U.S. Pat. No. 5,072,907 for TRIPOD HEAD; Disclosure is made of a ball and socket with a camera plate on the ball.

U.S. Pat. No. 5,664,750 for CAMERA MOUNT; Disclosure is made of a double ball and socket on a mast.

U.S. Pat. No. 5,790,910 for CAMERA MOUNTING APPARATUS; This patent discloses a ball and socket mount for a surveillance camera.

None of the above prior art patents disclose either singly or collectively the invention of this present disclosure.

BRIEF DESCRIPTION OF DRAWINGS

FIG. 7—Plan view of bottom cone mount.

FIG. 8—Plan view of bottom cone.

FIG. 9—Camera and mount ball attached assembly

FIG. 10—Cradle cup mounted on tripod platform.

DRAWING LEGENDS

Figure 1:
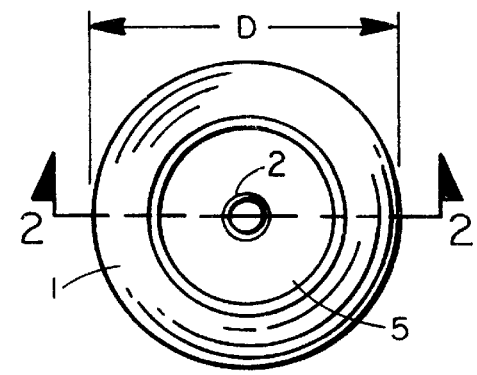
FIG. 1—Plan view of camera mounting ball.

1—Camera mount ball.
2—Threaded insert.
3—Bottom cone; conical section of camera mount ball.
4—Cradle cup.
5—Flat top of ball.
6—Threaded female insert.
7—Camera.
8—Tripod platform.
9—Tripod legs.
D—Ball diameter.
D'—Diameter of cradle cup lower section less than D.
D"—Diameter of cradle cup upper section greater than D.
10—Tripod.
11—Upper section of cradle cup.
12—Lower section of cradle cup

DETAILED DESCRIPTION

This invention is to disclose apparatus for providing stability to a camera for taking pictures for prevention of blurs, or fuzzy pictures.

The apparatus includes as shown in FIGS. 1,2,5,6,9,11, and 12 a camera mount ball 1 having a pear or oblate spheroid shape with a flat top 5 on the camera mount ball 1 and centered in the flat top 5, of this camera mount ball 1 is a threaded insert 2 and a base segment bottom cone 3, shown in FIGS. 7 and 8, as plan views of this bottom cone segment.

Reference is now made to FIG. 9, to show the camera mount ball 1, and threaded insert 2 on camera mount ball 1 threaded into the camera 7 female threaded opening, which female threaded opening is standard in all cameras for mounting directly on a tripod platform.

The assembly of the camera 7, with the camera mount ball 1 attached to the camera 7, as shown in FIG. 9 is placed in cradle cup 4, of cylindrical shape (see FIGS. 5, 6, 11, 12) with the camera mount ball 1 extending into the cradle cup 4. The cradle cup 4 is shown in FIGS. 3, 4, 5, 6, 10 11, and 12, and is of cylindrical shape.

Figure 3:
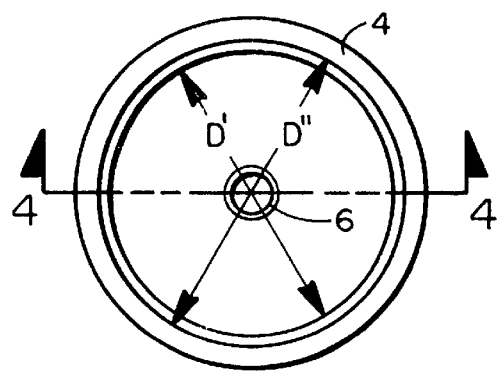
FIG. 3—Plan view of ball cradle cup.
Figure 4:
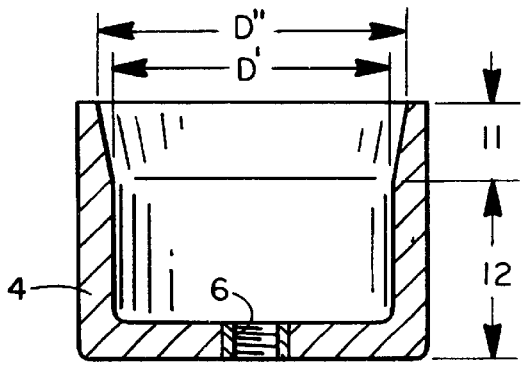
FIG. 4—Elevational cross section view of ball cradle cup.
Figure 6:
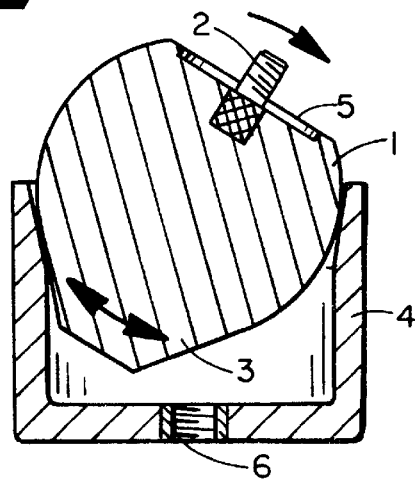
FIG. 6—Elevational view of ball tilted setting in cradle cup.
Figure 5:
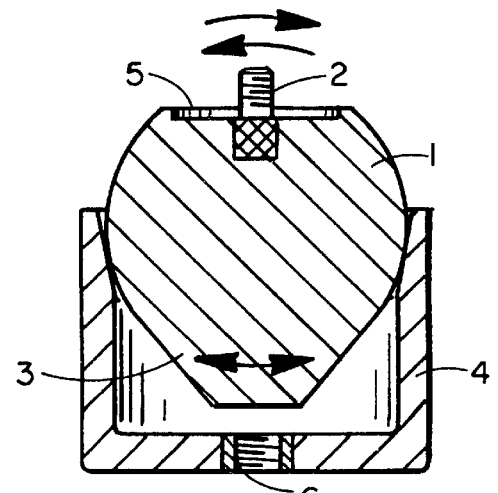
FIG. 5—Ball set in cradle cup; elevational view.

The plan view of the cradle cup 4 as shown in FIG. 3, and FIG. 4 is elevational cross section view. In the center of the bottom of the cradle cup 4, is a threaded female insert 6, for attachment by a threaded screw, of the cradle cup 4 to the platform 8, of tripod 10.

Figure 2:
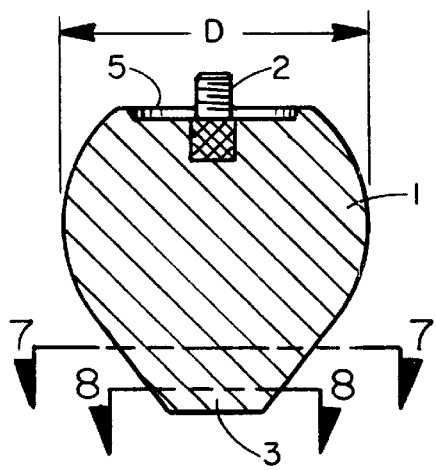
FIG. 2—Cross section elevational view of camera mounting ball.

Referring now to FIGS. 3 and 4 the inside diameters of the cradle cup 4 sections, based on the diameter D of the camera mount ball 1. see FIG. 2. ID' is diameter of cradle cup 4, lower section 12 less than D, and sets the limit of entry of camera mount ball 1 into the cradle cup 4. ID" diameter of upper section 11 of cradle cup 4 is greater than diameter D of camera mount ball 1.

Figure 11:
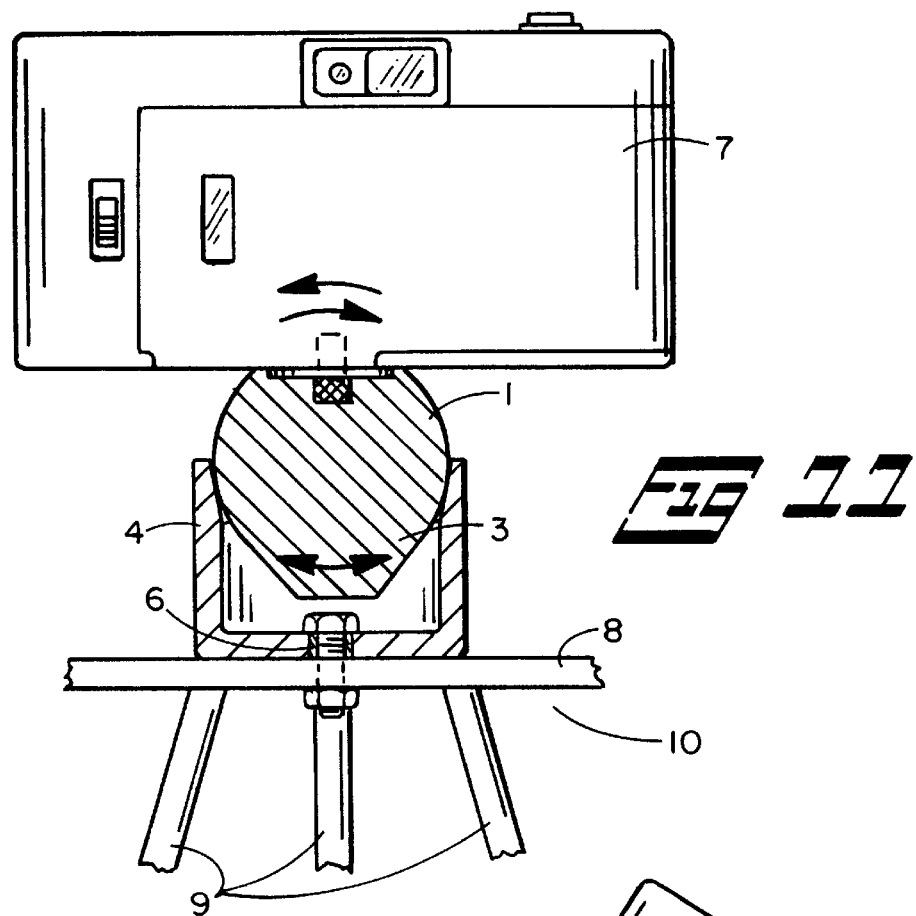
FIG. 11—Camera and mount ball sitting in cradle. cup mounted on tripod platform.
Figure 12:
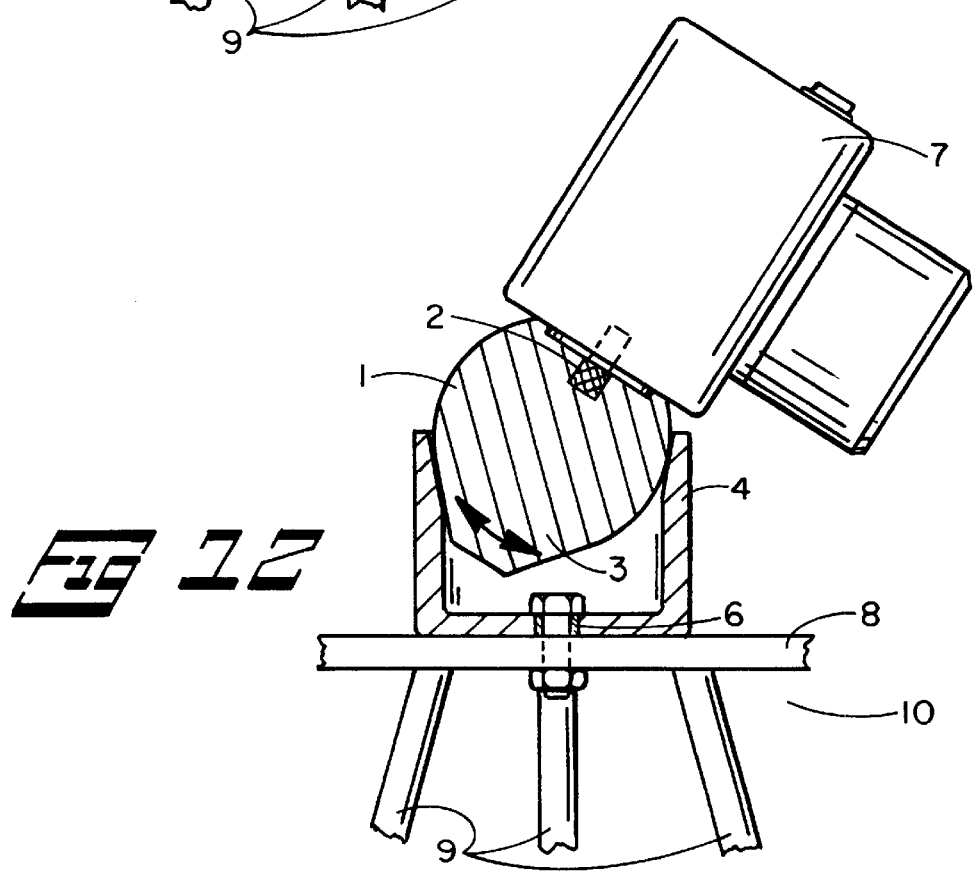
FIG. 12—Camera and mount ball sitting in tilt position in cradle cup mounted on tripod platform.

Referring now to the tripod 10, FIGS. 10, 11 and 12 show the tripod 10, tripod platform 8, and tripod legs 9, and further FIGS. 9 and 10 are shown with the camera 7 and camera mount ball 1 assembly aligned with the cradle cup 4, mounted on tripod platform 8 of tripod 10 and FIG. 11 shows the completed assembly of the camera 7 and camera mount ball 1 sitting in cradle cup 4.

As shown in FIG. 12, the camera 7, in tilt position, with camera mount ball 1 attached and the camera mount ball sitting in cradle cup 4, allows for free rotational movement of the camera 7 and camera mount ball 1 assembly and further the camera-ball assembly can be tilted to aim the camera either up or down. The tilt is limited by bottom cone 3 segment of the camera mount ball 1 hitting the inner wall of the cradle cup 4 as shown in FIG. 12, and further this insures the camera 7 camera ball mount 1 assembly against falling out of the cradle cup 4 when in any tilt position.

The above described apparatus simplifies the rapid removal of the camera from the cradle cup 4 by simply lifting the camera 7 camera mount ball 1 assembly from the cradle, cup 4 without unscrewing any mounting screws or control levers.

Further this invention discloses apparatus of a camera mount ball 1, attached to camera 7 by a threaded screw 2 extending into female thread in the camera bottom and a cradle cup 4 rigidly mounted on a tripod platform 8 and the camera mount ball 1 with a bottom cone section 3 opposite the camera mount on the ball and the camera 7 with camera mount ball 1 attached placed in the cradle cup 4 and the ball extending into the cradle cup 4 having a top diameter D" section at the top section 11 of the cradle cup 4 greater than the ball diameter D and the bottom cone section 3 of the ball extending into the cradle cup 4 lower section 12 having a smaller diameter D' than the ball diameter D to allow rotation and tilting of the camera and camera mount ball assembly.

To better describe the cradle cup 4 of this invention the cradle cup 4 mounted on a tripod platform 8 and the cradle cup 4 has a top section 11 diameter D" larger than the camera mount ball 1 diameter D, to allow entry of the camera mount ball 1 into the cradle cup 4 and the cradle cup 4 has a bottom section 12 diameter D' smaller than the camera mount ball 1 diameter D and the bottom cone section 3 of the camera mount ball 1 extends into the cradle cup 4 lower section 12 having a diameter D' less then the camera mount ball 1 diameter D.

On using the above described camera mount, the static friction between the ball shape and the cradle cup should be sufficient to hold the camera 7 in any set position, yet having low sliding friction to be easily moved to any other desired position.

This described apparatus for camera mount on a tripod platform allows for rapid mounting and de-mounting of the camera on a tripod platform.

The components of the camera mount ball 1 and cradle cup 4 may be formed of thermoplastic such as nylon, polyester, polyethylene, or polypropylene, or thermoset plastic material such as phenolic, melamine, melamine/phenolic polyester, polyurethane or urea, or other types of plastic or from other machined or formed material.

What is claimed is:

1. A camera mounted on a tripod platform wherein the improvement comprises:

an assembly of a camera and a ball, said ball having a generally oblate spheroid shape attached to said camera;

said oblate spheroid shaped ball having a bottom, conical section;

a cradle cup fastened to said tripod platform;

said assembly of said camera and said ball setting in an upper section of said cradle cup and;

said bottom conical section of said ball extending into a lower section of said cradle cup and said cradle cup having a smaller diameter than the spheroid diameter of said ball.

2. The camera mounted on tripod platform of claim 3, further comprising:

a—said cradle cup of cylindrical shape;

b—an upper section of said cradle cup having a diameter greater than diameter of said ball and;

c—a lower section of said cradle cup having a diameter less than diameter of said ball.

* * * * *